W. T. H. Daniels,
Feed Trough.
No. 110,015.   Patented Dec. 13, 1870.
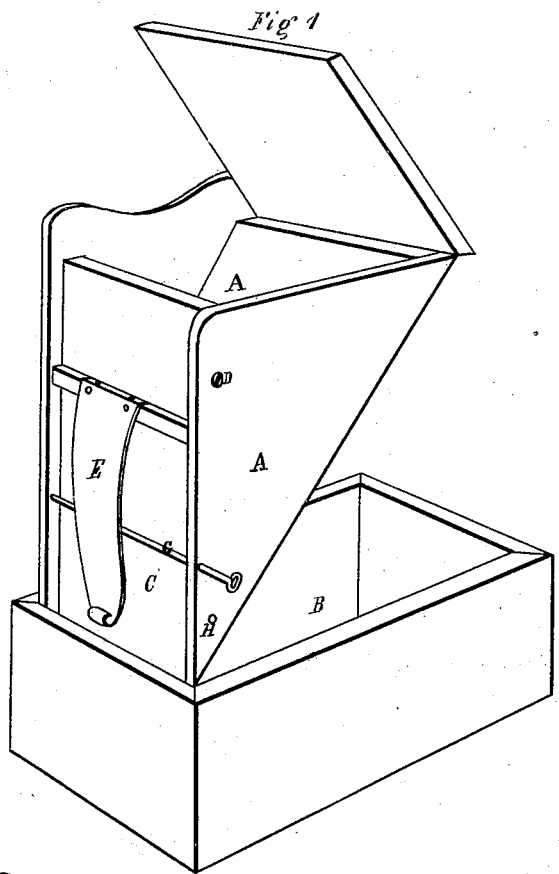
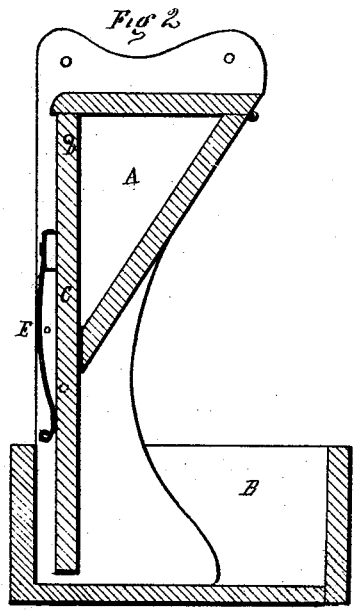
Inventor
William T. H. Daniels.
by Daniel Breed Att.
Witnesses
Wm H Seaman
Edw. F. Brown

United States Patent Office.

WILLIAM T. H. DANIELS, OF BELLVILLE, OHIO.

Letters Patent No. 110,015, dated December 13, 1870.

IMPROVEMENT IN FEED-REGULATORS.

The Schedule referred to in these Letters Patent and making part of the same.

*To all whom it may concern:*

Be it known that I, WILLIAM T. H. DANIELS, of Bellville, county of Monroe and State of Ohio, have invented a new and useful Improvement in Boxes or Regulators for Feeding Horses and other animals; and that the following is a full and exact description thereof, reference being had to the accompanying drawing and the letters of reference marked thereon.

In the accompanying drawing—

Figure 1 is a perspective view of my improved feed-box.

Figure 2 is a vertical section of the same.

My invention consists in a feed-box or regulator which allows the horse or other animal to reach only a small quantity of oats or other feed at one time, in order to induce the animal to fully grind or masticate the feed before swallowing the same, and also to prevent greedy animals from seizing too much feed at once, and thus choking, as is sometimes the case.

I first make a box or hopper, A, which may be wedge-shaped or of any suitable form, to direct the feed to its bottom or discharge opening. This box may be fastened to the side of the stall, so that the feed will fall into the lower box or trough B, where the horse or other animal can reach the same in the usual way.

On one side of the box A is an oscillating or swinging feed-board, C, hinged at top by pivots or screws D.

A spring, E, holds this board so as to prevent the oats or grain from falling from the upper box A into the lower B, except when the animal, in feeding from this lower box, pushes against the lower end of the board C.

By this arrangement the animal will feed slowly and will thoroughly grind his food.

An adjustable gauge-rod, G, is employed to regulate the discharge of the feed. This rod may be put in different holes, H, in order to prevent the feed-board C from swinging back too far. In this way the flow of the feed is regulated for oats, corn, or other grain.

The board C may be so hung as to close by falling or swinging, or a pulley and weight or suitable equivalent may be used in place of the spring E for holding the board.

Having thus described my invention,

I claim—

The oscillating feed-board C, operated by the spring E or its equivalent, in combination with the box or hopper A, substantially as set forth.

WILLIAM T. H. DANIELS.

Witnesses:
  WM. H. SEAMAN,
  EDM. F. BROWN.